United States Patent
Krueger

(10) Patent No.: US 9,770,685 B2
(45) Date of Patent: Sep. 26, 2017

(54) FILTER ELEMENT FOR CLEANING AN AIR STREAM THAT IS CHARGED WITH PARTICLES AND FILTER DEVICE THAT IS EQUIPPED WITH SAID ELEMENT

(75) Inventor: Klaus Krueger, Steyr (AT)

(73) Assignee: KAPPA Filter Systems GmbH, Steyr-Gleink (AT)

( * ) Notice: Subject to any disclaimer, the term of this patent is extended or adjusted under 35 U.S.C. 154(b) by 0 days.

(21) Appl. No.: 12/998,320

(22) PCT Filed: Oct. 2, 2009

(86) PCT No.: PCT/AT2009/000378
§ 371 (c)(1),
(2), (4) Date: Apr. 8, 2011

(87) PCT Pub. No.: WO2010/040158
PCT Pub. Date: Apr. 15, 2010

(65) Prior Publication Data
US 2011/0258976 A1    Oct. 27, 2011

(30) Foreign Application Priority Data

Oct. 8, 2008 (AT) ................................ A 1572/2008

(51) Int. Cl.
*B01D 46/00* (2006.01)
*B01D 46/02* (2006.01)
*B01D 46/06* (2006.01)

(52) U.S. Cl.
CPC ......... *B01D 46/02* (2013.01); *B01D 46/0068* (2013.01); *B01D 46/06* (2013.01); *B01D 2265/023* (2013.01)

(58) Field of Classification Search
CPC .... B01D 46/02; B01D 46/0068; B01D 46/06; B01D 46/0072; B01D 2265/023; B01D 46/00

(Continued)

(56) References Cited

U.S. PATENT DOCUMENTS 3,853,509 A * 12/1974 Leliaert ................... 55/341.1
4,247,313 A    1/1981 Perry, Jr. et al.
(Continued)

FOREIGN PATENT DOCUMENTS

CA    1 331 351    8/1994
DE    24 19 604    10/1975
(Continued)

OTHER PUBLICATIONS

International Search Report.

*Primary Examiner* — T. Bennett McKenzie
(74) *Attorney, Agent, or Firm* — Collard & Roe, P.C.

(57) ABSTRACT

The invention relates to a filter device (1) and a filter element (8) for cleaning an air stream that is charged with particles. The filter element (8) comprises a bag-type filter sock (17) consisting of an air-permeable, flexible material and a support body (21) in the interior of the bag-type filter sock (17). The first axial end of the bag-type filter sock (17) is closed and the second axial end has an air outlet that allows the cleaned air stream to exit the filter sock (17). An inner diameter or inner periphery of the filter sock (17) is greater in cross-sectional areas between the air outlet and its closed first end, in particular at least 10%, preferably between 20% and 40% greater than the greatest outer diameter or outer periphery of the support body (21), such that the filter sock (17) is dimensioned in relation to the support body (21) contained therein such that in the inactive state of the filter element (8) without air flow, said sock surrounds the support body (21) in a relatively loose manner and with lateral clearance. When air flows against the outer surface of the filter sock (17), folds or undulations are deliberately formed, at least in the jacket section of the filter sock (17), and the filter sock (17) thus lies comparatively closer to the support body (21).

24 Claims, 5 Drawing Sheets

(58) Field of Classification Search
USPC .... 55/341.1–341.7, 361–382, 299, 304, 404; 15/94, DIG. 8
See application file for complete search history.

(56) References Cited

U.S. PATENT DOCUMENTS

| | | | | |
|---|---|---|---|---|
| 4,259,095 | A * | 3/1981 | Johnson, Jr. | 55/302 |
| 4,324,571 | A * | 4/1982 | Johnson, Jr. | 55/302 |
| 4,336,035 | A * | 6/1982 | Evenstad et al. | 95/286 |
| 4,395,269 | A | 7/1983 | Schuler | |
| 4,816,154 | A | 3/1989 | Hartley | |
| 4,874,586 | A * | 10/1989 | Szymanski et al. | 422/177 |
| 5,273,561 | A * | 12/1993 | Zeren | 96/406 |
| 5,562,746 | A | 10/1996 | Raether | |
| 5,591,338 | A * | 1/1997 | Pruette | B01D 29/21 210/493.1 |
| 5,690,710 | A * | 11/1997 | Stephan | B01D 46/0001 55/361 |
| 5,730,766 | A | 3/1998 | Clements | |
| 6,073,905 | A | 6/2000 | Wilson | |
| 6,230,361 | B1 * | 5/2001 | Griffin | A47L 5/365 15/310 |
| 8,491,688 | B2 * | 7/2013 | Peshina | B01D 46/06 55/379 |
| 2002/0134237 | A1 * | 9/2002 | Miller | 95/63 |
| 2004/0237483 | A1 * | 12/2004 | Clements | 55/341.1 |
| 2005/0034436 | A1 * | 2/2005 | Pipkorn | B01D 46/0093 55/379 |
| 2008/0022643 | A1 * | 1/2008 | Fox | B01D 39/163 55/521 |
| 2010/0276353 | A1 * | 11/2010 | Patrovsky | 210/236 |

FOREIGN PATENT DOCUMENTS

| | | |
|---|---|---|
| DE | 234 796 | 4/1986 |
| DE | 37 33 255 | 4/1988 |
| DE | 41 11 789 | 10/1992 |
| EP | 0 243 028 | 10/1987 |
| GB | 1 003 426 | 9/1965 |
| GB | 1 493 520 | 11/1977 |
| GB | 2 195 558 | 4/1988 |
| WO | WO 02/02206 | 1/2002 |

* cited by examiner

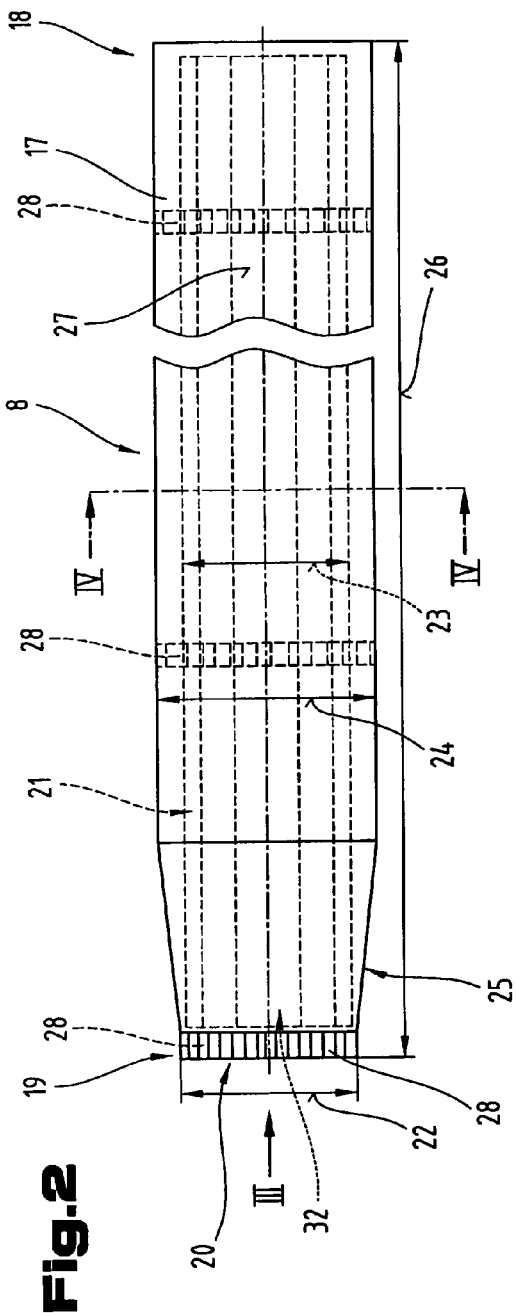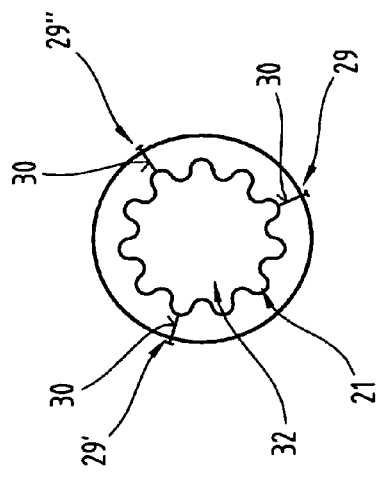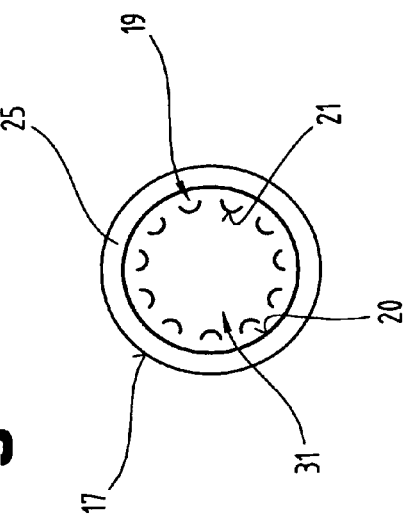

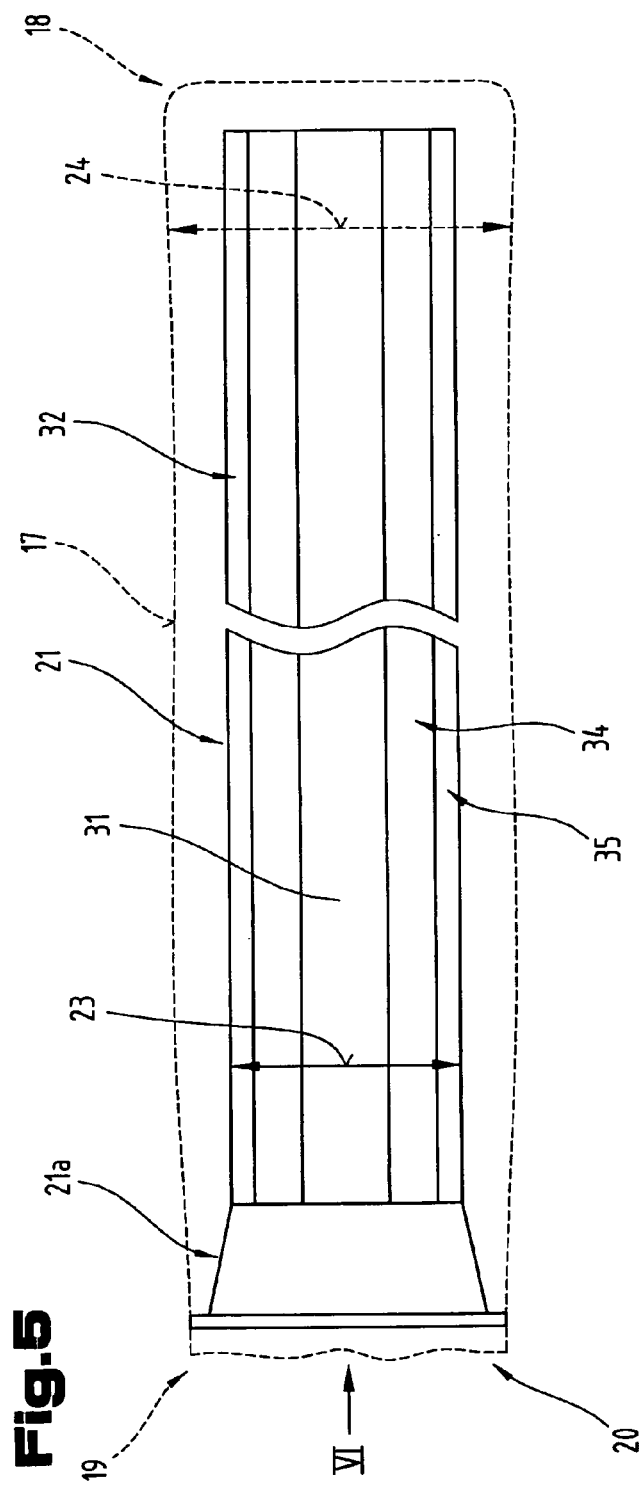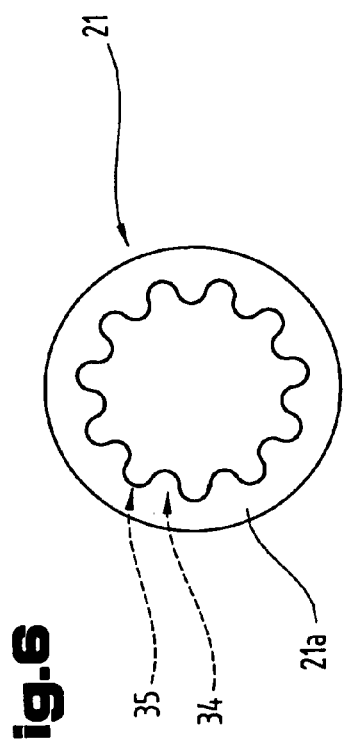

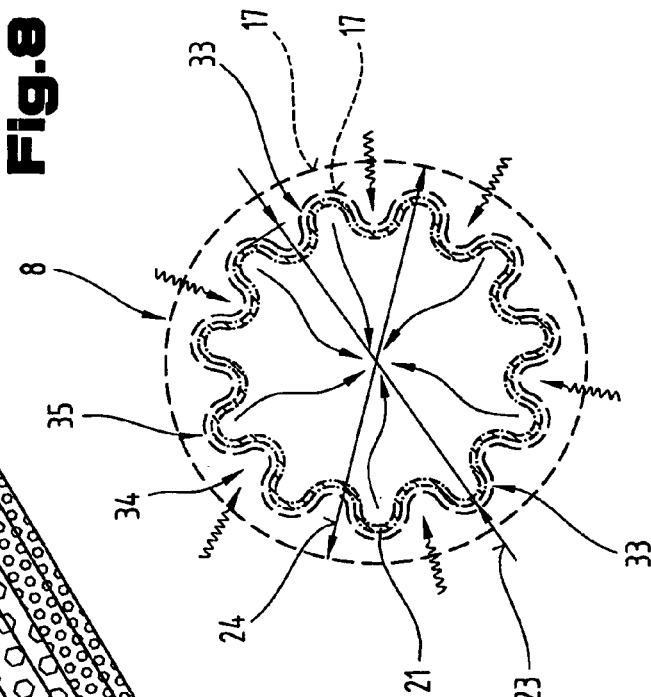
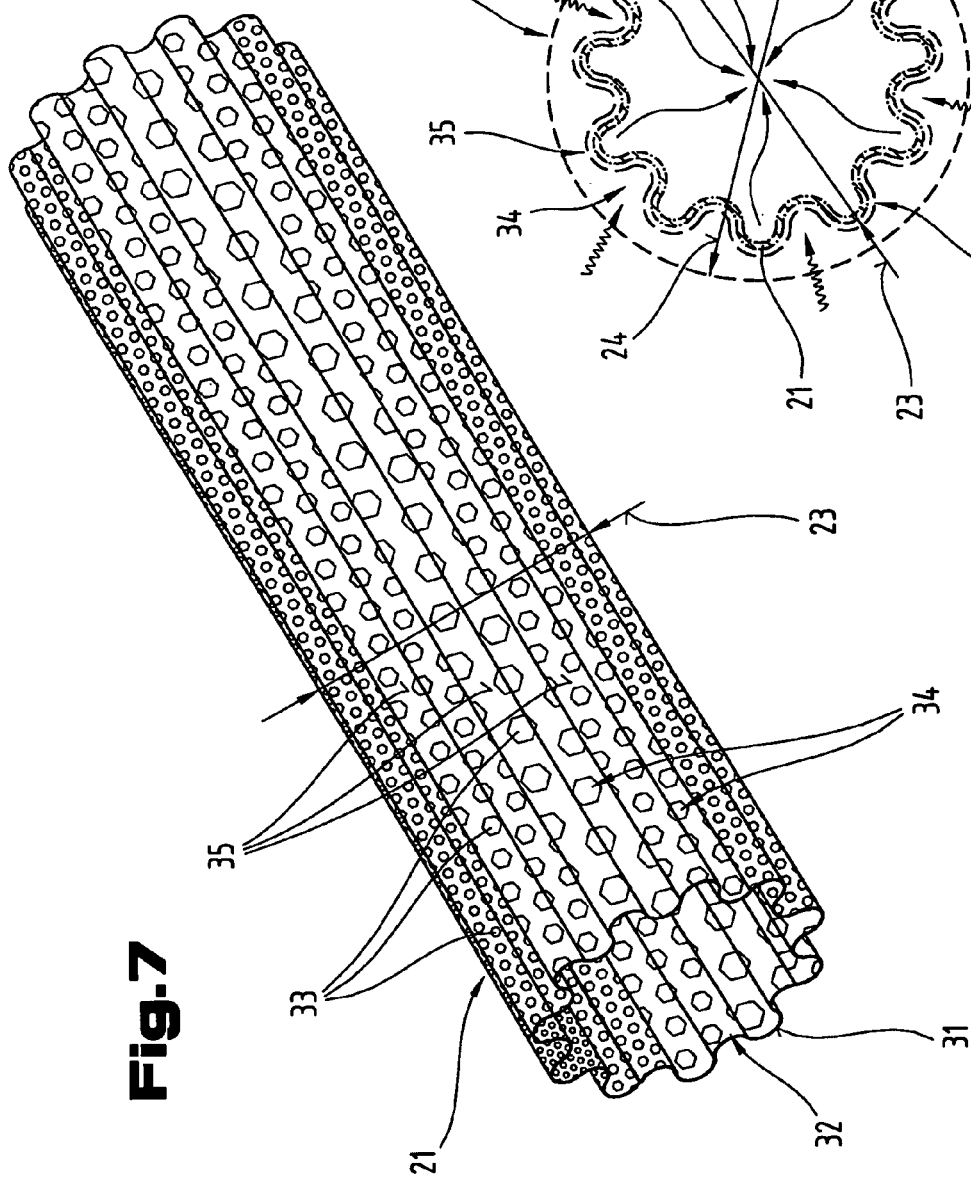

FILTER ELEMENT FOR CLEANING AN AIR STREAM THAT IS CHARGED WITH PARTICLES AND FILTER DEVICE THAT IS EQUIPPED WITH SAID ELEMENT

CROSS REFERENCE TO RELATED APPLICATIONS

This application is the National Stage of PCT/AT2009/000378 filed on Oct. 2, 2009, which claims priority under 35 U.S.C. §119 of Austrian Application No. A 1572/2008 filed on Oct. 8, 2008, the disclosure of which is incorporated by reference. The international application under PCT article 21(2) was not published in English.

The invention relates to a filter element for cleaning an air stream that is charged with particles, and a filter device equipped therewith.

A generic filter element, often referred to as a tube filter, is known in practice. Such a filter element comprises as a filter medium a net or fabric-like filter sock, which is in the form of a bag and thus covers relatively closely a support basket arranged inside the filter sock. In this case, the internal diameter of the filter sock is approximately the same size or only slightly larger than the external diameter of the support basket, so that the dimensionally stable support basket can be only just inserted into the dimensionally flexible filter sock. The corresponding support basket consists in this case of a plurality of rod-like profiles, which are joined or welded together in the manner of a net or basket. In particular, such a support basket comprises a plurality of profiled rods arranged next to one another in a circle and spaced apart from one another, which are held in position by at least one circular holder ring. The thus hollow cylindrical support basket is then covered relatively tightly by the bag-like filter sock, wherein the cross-sectional dimensions of the support basket, that is circular or polygonal in cross section, and the cross-sectional dimensions of the filter sock are approximately identical. Said tube filter known from the prior art, comprising a bag-like filter sock and a basket-like support basket inserted relatively tightly therein, is not completely satisfactory as a filter.

In WO 02/02206 A2 a generic filter device is described with a plurality of filter elements mounted therein. Said filter elements are in this case formed by so-called filter cartridges, which have an elliptical cross section. Said filter cartridges consist of a folded filter paper, which is held in position between an inner and an outer support basket. The inner and outer support basket for the folded filter paper are in this case made from an expanded metal element. The axial ends of said filter cartridges have end caps, in which the axial ends of the filter paper and the support baskets are secured, in particular cast. Said filter cartridges are inserted from the exhaust air chamber into the filter device and pushed with a sealing ring against the flat side of a separating wall facing the dirty air chamber between the dirty air chamber and the clean air chamber. It is a disadvantage in this case that such filter cartridges are expensive and have to be completely replaced after reaching the maximum period of use. In addition, the handling of such filter cartridges is only satisfactory to a limited degree, as the service and maintenance of the filter device or its filter elements is performed from the dirty air chamber of the filter device.

The underlying objective of the present invention is to create a relatively inexpensive filter element that is easy to maintain, but which still provides the best possible filter performance. A further objective of the invention is to provide an improved filter device.

The first objective is achieved by the filter element according to the invention.

An advantage of the features of the filter element according to the invention is that such a filter element has an optimized filter performance but can still be constructed relatively inexpensively. In addition, the service and maintenance costs are low or the associated service or maintenance costs are relatively low, as it is possible to replace the filter sock if necessary relatively easily and rapidly. The relatively inexpensive, bag-like filter sock is in this case simply a perishable or replacement part. A particular advantage of the filter element of the invention is that compared to standard tube filters it provides a much better filter performance. In particular, the filter element according to the invention with unchanged maximum external dimensions has a much larger surface area and thereby a much larger effective filter surface. In any case the filter performance of the filter element according to the invention is considerably better than a conventional filter element with almost the same or identical external dimensions. Owing to the relatively large area or large volume filter sock and the support body cooperating therewith, which compared to the filter sock is dimensioned to be relatively small or narrow, the maintenance or cleaning intervals can also be extended in an advantageous manner, without thereby worsening the performance of the filter. In any case with essentially uniform external dimensions of the filter element or its support body larger effective filter surfaces are made available. This means that the filter element according to the invention has an increased, effective filter surface area, even though its external dimensions remain the same or are not much greater. This is achieved mainly by means of the structured wave formation or by the intensive, intentional fold formation in the dimensionally flexible, air permeable filter sock in cooperation with its support body.

A particular advantage of the design according to the invention is also that existing filter devices can be provided easily with the filter elements according to the invention with an enlarged filter surface, since the external dimensions of the improved filter element according to the invention do not vary or only vary slightly from standard filter elements. In particular, a filter surface can be obtained that is about 30% larger and such a filter element can be inserted easily into an existing filter device. An essential advantage of the considerably enlarged filter surface area of the claimed filter element is also that a much lower inflow speed can be achieved or a lower flow pressure acts on the filter sock. This has a positive effect on the degree of separation or the separation performance of the filter element. The larger filter surface area of the filter element however also allows for a longer period of use of the filter sock, without the interim maintenance or interim removal of potentially adhering particles. A further advantage of the design according to the invention is that mechanical wear, caused by flow pressure and by the particles hitting the filter sock, is minimized and a filter element according to the invention can thus be used for a longer period. The thus improved filter performance of the filter element has a positive effect on the energy efficiency or effectiveness of the filter device, as relatively low flow pressure or low pressure is sufficient to achieve a high flow rate or direct a large volume of crude gas through a corresponding filter element and filter it accordingly. A further advantage of the filter element according to the invention is that the latter can easily have an axial length of up to 10 meters, without mechanical instabilities occurring.

A development according to an embodiment is also advantageous, as in this way a filter sock is created with a bottle-like body shape when viewed from the side. Such a filter sock can be installed exactly and with high degree of functional reliability into an existing filter device, whereby such a filter sock in its casing section facilitates a reproducible or planned fold formation. The conical collar section of the filter sock also enables an optimized or effectively sealing attachment of the filter sock inside the filter device. Furthermore, a corresponding filter sock can be inserted relatively easily through the corresponding mounting opening in a separating wall or separating plate of the filter device and can be secured reliably around the opening. It is also essential that such a filter sock enables an almost perfect or almost uniform fold or wave formation within the casing section of the filter sock, although the filter sock surrounds the central support body in an inactive or low pressure-free state of the filter device relatively loosely or with play in between.

Also a design according to another embodiment is an advantage, as in this way a large proportion of the axial extension of the casing station of the filter sock can form a plurality of defined sinus or meandering-shaped folds or surface waves, so that the filter sock can have as far as possible a large filter surface area or a relatively large area filter medium.

By means of the design according to another embodiment a planned ruffling or as far as possible a uniform wave or fold formation is facilitated at least in the casing section of the filter sock, if during the operation of the filter device suitable low pressure is established on the inside of the filter sock or the filter element.

By means of the design according to another embodiment a support body, which prevents the compression of the filter sock by the effect of low and high pressure, can be inserted easily from the top into a prepared suspended bag-like filter sock. Furthermore, there can be a practical and secured fixing of the support body and the filter sock around the corresponding opening in the separating plate of a filter device.

Also a development according to another embodiment is particularly advantageous, as in this way a planned relative positioning or as far as possible an even distribution of the large area or large volume, relatively flexible filter sock is achieved relative to the stable support body. Furthermore, with a little handling and in a relatively short period a precise casing or covering of the support body is achieved by means of such a filter sock.

A development according to another embodiment is also advantageous, as in this way the support body can be inserted simply and rapidly into the filter sock or the filter sock can be pushed onto the support body, and simply by means of pushing it on a permanently even distribution or relative positioning is achieved between the support face of the support body and the surface sections of the filter sock.

Also another embodiment is advantageous, as in this way a one-sided bunching up of the bag-like relatively unstable filter sock can be prevented relative to the comparatively stable support body.

By means of the development according to another embodiment it is possible to prevent reliably multi-layered folds or one-sided accumulations and the diametrically opposite tightening of the filter sock.

In another embodiment it is an advantage that such connecting elements can be operated without tools and thus ensure particularly simple handling. Furthermore, any necessary servicing activities can be carried out on the filter elements spontaneously and rapidly.

A particularly light-weight support body, which is optimized in terms of flow technology, is achieved by the measures according to another embodiment. A further advantage of this embodiment is that such support bodies can be constructed relatively inexpensively but still are sufficiently stable. Furthermore, the flow technical properties of such a support body can be adapted easily to the respective requirements or conditions of use.

In another embodiment an ideal ratio between adequate support effect, low flow resistance and high robustness is achieved.

By way of the measures according to another embodiment a support body is achieved, which has a particularly low flow resistance but still provides sufficiently good support for the filter sock.

A particularly advantageous embodiment of the support body has a high degree of mechanical stability, enables the creation of a relatively large casing or support surface for the flexible filter sock and at the same time provides optimal protection for the filter sock. In particular, in this way sharp-edged transitions and pointed or linear support or contact areas are avoided between the support body and the filter sock. The tearing or chafing of the filter sock on the support body is effectively prevented.

Also by way of another embodiment a support body is created with compact external dimensions but still with a relatively large area casing or support surface for the filter sock. Such an enlargement of the surface area of the support body in this case facilitates the desired adjustment or fitting of the relative large area, flexible filter sock relative to the stabile support body. In particular, the flexible filter sock can be adjusted relatively exactly and uniformly to the correspondingly contoured support body.

By way of the measures according to another embodiment in a simple and effective manner an increase in the surface area of the support body can be achieved, without the largest external dimensions or the maximum extensions of the support body having to be increased. Thus the filter surface area can be enlarged with an essentially uniform space requirement for the filter element and the filter performance can be improved.

An advantage resulting from the features of another embodiment is that the filter sock is protected as far as possible and its period of use can be extended.

By way of the measures according to another embodiment, an effective structuring of the filter sock or an even distribution of the filter sock is achieved in relation to the casing or support surface of the support body. A further advantage is that the robustness of the filter sock is increased and also filter socks with relatively low tearing resistance can be used easily. A considerable advantage is also that in this way the cleaning of the filter sock, in particular cleaning by means of compressed air is particularly effective. In particular, by means of the effect of compressed air on the inside of the support body and thus also on the inside of the filter sock a pulse-like acceleration or expansion of the filter sock can be achieved. This means that those sections of the filter sock, which after the activation of the filter operation lie within the depressions of the support body, are accelerated by the compressed air pulse radially outwards or moved suddenly out of the depressions, whereby on the outer surface of the filter sock any adhering particles can be repelled or shaken off respectively. In particular, the filter sock can be blown up by compressed air from the inside and returned into its original, relatively high volume and superficially relatively smooth shape, whereby a large proportion of the particles or dust adhering to the outer side can be repelled particularly reliably. The embodiment according to the invention thus enables a particularly effective and rapid cleaning of the filter element by means of a compressed air flow on the inside of the filter element or by means of a brief compressed air pulse introduced into the inside of the filter.

Another embodiment enables the enlargement of the surface of the filter element at the same time as protecting the filter sock, which owing to the low pressure or high pressure of the air flow is placed or pressed more closely or tightly around the support body.

Furthermore, a design according to another embodiment is an advantage, as in this way support bodies with a sufficient support effect for the filter sock but still with a mass that is as low as possible can be created. A further advantage is that such support bodies can achieve a particularly low flow resistance, can ensure as far as possible a planned or reproducible surface structuring in a relatively large area or large volume filter sock and can be assembled relatively inexpensively. Furthermore, the surface enlargement of the filter element achievable with such a support body is particularly significant, as not only can a surface enlargement be achieved in relation to the cross sectional circumference, but also in relation to the longitudinal extension or the axial length of the filter element, when the individual ring elements, which are star or gear-shaped in their outline contour, are held spaced apart from one another at a suitable distance. In this way either relatively compact external dimension can be achieved and despite keeping to or maintaining the maximum dimensions of the filter element its filter performance can be increased considerably.

The objective of the invention is also achieved however by a filter device according to another aspect of the invention.

It is advantageous in this case that said filter device can be run particularly economically, since the filter elements are inexpensive and can be easily replaced or cleaned thoroughly after getting dirty during use. Cleaning should be carried out at the very latest when a large number of particles adheres to the outer filter surface of the filter elements and the flow resistance of the filter device has increased to an undesirable high amount. A further advantage of this filter device is that the maintenance or replacement of the filter elements can be performed from the clean gas side, in particular from the clean air chamber. In any case, the filter socks to be maintained or the filter elements to be replaced from the clean air chamber are removed from the dirty air chamber and from the clean air chamber are inserted again into the dirty air chamber. Opening the dirty air chamber is thus not absolutely necessary, in order to replace the filter socks or the claimed filter elements. An essential advantage of said filter device is also that in connection with the characterized filter element a much improved filter performance is achieved, without structural changes being necessary.

By way of the measures according to another embodiment the filter performance of the filter device is improved, as filter socks can be used with a comparatively larger filter surface area. In addition, a high degree of efficiency of the filter device is achieved, as without alterations and despite a uniform diameter of the opening for holding the filter elements much more efficient filter elements can be used, which can be easily mounted or put into operation owing to the dimensional flexibility of the filter sock.

Also by way of the measures according to another embodiment a structural conversion of an existing filter device becomes unnecessary, since the filter device can mount a support body with essentially uniform, maximum, external dimensions, whereby said support body in connection with the relatively large area or large volume filter sock forms a much larger filter surface, which improves the filter performance of the filter device overall. In this embodiment, a maximum cross sectional extension of a stable support body is dimensioned for the bag-like, flexible filter sock, such that the support body can be moved without deformation from the clean air chamber via the opening into the dirty air chamber.

For a better understanding of the invention the latter is explained in more detail with reference to the following Figures.

In a much simplified, schematic representation:

FIG. 2 shows a filter element for use in a filter device according to FIG. 1 comprising a hose or bag-like filter sock with an air-permeable support body inserted therein;

FIG. 3 shows the filter element according to FIG. 2 in side view according to arrow III in FIG. 2;

FIG. 4 shows the filter element according to FIG. 2 in cross section along the lines IV-IV in FIG. 2;

FIG. 5 shows a further exemplary embodiment of an air-permeable support body for a filter element according to FIG. 2 in a view of its casing surface;

FIG. 6 shows the support body according to FIG. 5 in a view of its end face according to arrow VI in FIG. 5;

FIG. 7 shows an air-permeable support body provided with numerous openings for use in connection with a filter element according to FIG. 2 in perspective view;

FIG. 8 shows the filter element according to FIG. 2 during an active filter operation with air to be cleaned flowing in from the outside in a schematic cross sectional view by way of example;

Figure 1:
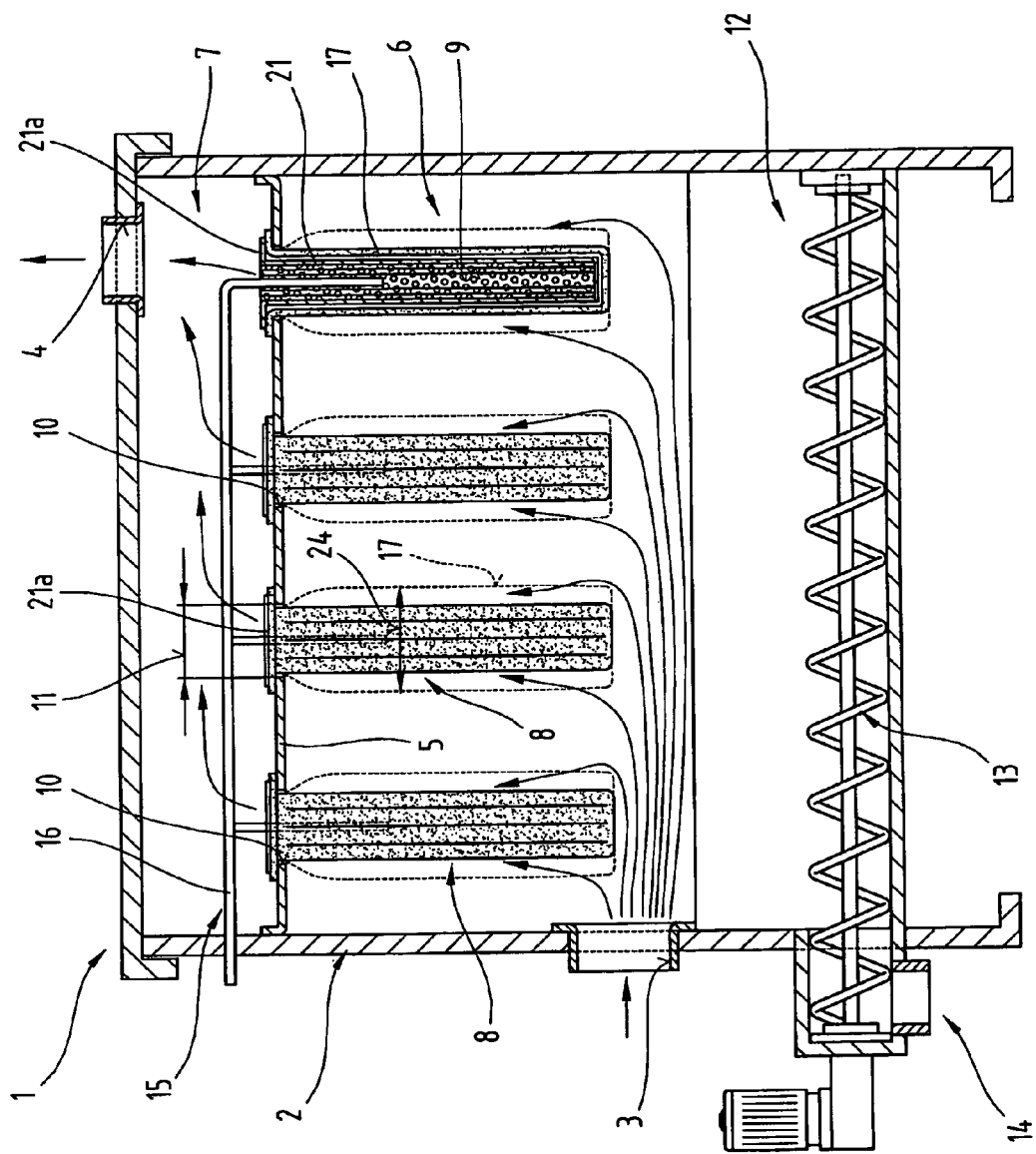
FIG. 1 shows an exemplary embodiment of a filter device with a plurality of filter elements inserted therein in a partial cross sectional view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

FIG. 1 shows an exemplary embodiment of a filter device 1 for cleaning air flows, which are loaded with particles or impurities floating therein such as for example dust or flakes. The filter device 1 is thus used for cleaning a supplied or guided through air flow, which is loaded with various different solid particles. By means of the filter device 1 at least a specific amount or specific number of said particles are separated from the air stream.

For this the filter device 1 comprises a housing 2 with at least one air inlet opening 3 for uncleaned air charged with dust particles for example. On the housing 2 at least one air outlet opening 4 is provided, through which the air treated or cleaned in the filter device 1 is conducted or can escape into the immediate area around the housing 2. To achieve a suitable air flow, as already known, at least one not shown low pressure generator is provided. The latter is preferably arranged on the clean gas side of the filter device 1, that is after the respective filter stages.

As a low pressure generator preferably a suction blower is provided, by means of which the air to be cleaned is suctioned into the filter device 1 or is suctioned through the filter device 1. Alternatively, it is also possible, instead of a low pressure generator or in addition to a low pressure generator on the raw gas side, i.e. in flow direction in front of the air inlet opening 3, to provide a high pressure generator, in particular a compressed air blower. In the housing 2 at least one separating wall or separating plate 5 is formed, which can also be denoted as a separating base or separating panel. Said separating plate 5 divides the housing 2 into a dirty air chamber 6 and a clean air chamber 7.

Inside the housing 2 at least one filter element 8 is arranged, by means of which the particles are separated or removed from the air to be cleaned. In particular, the impurities in the supplied air stream or crude gas are separated or held back by the at least one filter element 8. The at least one filter element 8 thus projects into the dirty air chamber 6 or the filter element 8 is arranged largely inside the dirty air chamber 6. The filter element 8 is preferably designed as a hollow body 9, whose casing or surface represents a filtering air flow connection between the dirty air chamber 6 and the clean air chamber 7. In particular, the casing or surface of each of the filter elements 8 is sufficiently permeable to gas and air, whereas the particles or floating materials to be separated in the filter element 8 largely remain suspended and are not directed to the clean air chamber 7.

In the separating plate 5 at least one opening 10 is made, through which respectively a filter element 8 can be pushed and secured in a preferred manner from the clean air chamber 7 in the direction of the dirty air chamber 6. To position and/or secure the filter element 8 on the separating plate 5 on the filter element 8 at least one collar or flange-like extension can be provided, which prevents the filter element 8 sliding through into the dirty air chamber 6.

According to an advantageous embodiment the filter device 1 at its lower end section, in particular in connection with the dirty air chamber 6 comprises a funnel-like collecting pan 12 for particles separated from the air stream. In the collecting pan 12 an application device 13, for example in the form of a conveyor screw, can be provided, in order to be able to deliver in a meterable and continuous manner particles collected in the collecting pan 12 to an outlet opening 14. Alternatively, it is also possible to conduct the collected particles by gravity.

According to an advantageous embodiment the filter device 1 also comprises at least one cleaning device 15 for the potential cleaning or automatic cleaning of the filter elements 8. In particular, after a longer period of use on the outer surface or casing surface of the filter elements 8 an undesirably dense or concentrated collection of separated particles or dust can be formed. Said deposits or particles adhering to the filter element 8 increasingly worsen the performance of the filter device 1, since said collections or deposits increasingly block up the filter elements 8 and in this way also increase the flow resistance of the filter device 1. For the necessary and/or automatically controlled cleaning of the filter elements 8 the cleaning device 15 can be an integral component of the filter device 1. As already known, the cleaning device 15 can be formed by a compressed air cleaning device 16. Said compressed air cleaning device 16 comprises a not shown compressed air generator, the compressed air of which is introduced via pipes and not shown valves specifically as compressed air or compressed air pulses into the inner chamber of the hollow body-like filter elements 8. Said compressed air pulses or compressed air phases cause the repulsion or release of particles, which adhere to the outer surface or filter surface of the filter elements 8.

To intensify its cleaning power the compressed air cleaning device 16 can also comprise Venturi elements or nozzles, a plurality of rows of nozzles, movable compressed air nozzles and the like. After activating the cleaning device 15 at least a specific proportion of the adhering particles falls from the outer surface or filter surface of the filter elements 8. Said particles are actively repulsed by the effect of compressed air and with the effect of gravity are transferred into the base area of the dirty air chamber 6 and held in the collecting pan 12 or a corresponding collecting container. Alternatively or in combination with a compressed air cleaning device 16 it is also possible to provide cleaning devices 15 for the filter elements 8 which use vibrational movements.

The filtering casing or surface of the at least one filter element 8 is also formed by a tube or bag-like filter sock 17. This preferably bag-like filter sock 17 is made from a flexibly shaped material which is also sufficiently permeable to gas and air, made in particular from a fabric or grid-like filter material. Textile-like or synthetic materials with a net or grid-like structure in the corresponding mesh or grid width are suitable as filter materials in order to hold back the respective particles or separate them from the air stream.

It is essential that an expanded filter sock 17 or one that is stretched or expanded to its maximum volume is greater with respect to its internal diameter 24 or inner circumference than a diameter 11 or circumference of the opening 10 in the separating plate 5. This means that a maximum expanded filter sock 17 or one that has been extend to a maximum in its bag or inner volume—as indicated schematically by dashed lines in FIG. 1—would not pass from the clean air chamber 7 through the opening 10 or could not reach the dirty air chamber 6, if the filter sock 17 was not flexible or bendable and thus easily folded or pressed together to obtain a smaller volume or a smaller cross section.

As shown best with reference to the dashed lines in FIG. 1, the filter sock 17 in the position of rest of the filter device 1, i.e. without the external effect of flow forces, has a dimensional extension or a maximum internal volume, which in this expanded state would prevent the insertion of the filter sock 17 from the clean air chamber 7 in the direction of the dirty air chamber 6, if the filter sock 17 were not made of a compressible material which is flexible in form and undamageable, such as e.g. a textile-like fabric. In particular, the filter sock 17 in the expanded or maximum expanded state could not be inserted through the opening 10 in the separating plate 5, as its external diameter is much greater in this state than the diameter 11 of the opening 10 provided in the separating plate 5. However, a dimensionally stable, inner support body 21 for the filter sock 17 is dimensioned such that it can be pushed through the opening 10, until it lies with its extended upper collar section 21a on the separating plate 5 or is delimited in the insertion movement relative to the opening 10. A maximum cross sectional extension of the stable support body 21 may be dimensioned for the bag-like, flexible filter sock 17 such that the support body 21 can be moved without deformation from the clean air chamber 7 via the opening 10 into the dirty air chamber 6.

During the operation of the filter device 1 the filter sock 17, which is relatively loose or has a relatively large volume in the position of rest relative to the support body 21—shown by dashed lines—owing to the external flow pressure or owing to the low pressure in the hollow chamber 9 of the filter element 9, bears much more closely against the support body 21, as indicated in FIG. 1 by solid lines. This means that the filter sock 17 shrinks in volume owing to the external action of air flow, in that in cooperation with the inner support body 21 it forms a plurality of surface waves or surface folds, as indicated by solid, vertically running lines inside the filter socks 17. The relatively large surface and thus also the relatively large filter surface of the filter sock 17 in this case results in a clear improvement in the filter performance of the filter element 8.

According to an advantageous embodiment the filter sock 17 is designed to be bottle-shaped in side view, wherein the tapering part section of the filter sock 17 is assigned to or is closest to an end section provided for the assembly or suspension of the filter element 8.

FIGS. 2 to 4 show schematically an advantageous embodiment of a filter element 8, as can be used in a filter device 1 according to FIG. 1. Said filter element 8 comprises as a filter medium at least one flexible filter sock 17, which forms the outer, filtering surface of the filter element 8. Such a filter element 8 with a flexible, bag-like filter sock 17 is relatively inexpensive and comparatively robust compared to the filter cartridges with multilayer folded filter papers known from the prior art. In particular, the generic filter element 8 according to FIGS. 2 to 4 can be maintained easily at relatively short intervals. Moreover, the filter medium, in particular the filter sock 17 on reaching the maximum period of use or its efficiency limit can be replaced relatively inexpensively, in order to achieve as far as possible a good or relatively constant filter performance.

The actual filter surface or the filter medium of the generic filter element 8 is thus formed by at least one hose or bag-like filter sock 17. Said filter sock 17 has sufficient permeability for gas or air flows. However, the permeability or mesh width of said preferably bag-like filter sock 17 is such that the particles to be separated are caught to a sufficient extent by the outer surface of the filter sock 17 and separated from the gas or air flow which is directed through the filter element 8. The filter sock 17 is made of a flexible, relatively unstable material. Preferably, the filter sock 17 is formed by a fabric or textile-like material, which is designed for separating the respective particles from the air flow supplied to the outer surface of the filter sock 17. Such flexible materials or filter socks 17 are known from the prior art in many different embodiments with regard to the respectively used filter material or substance.

The bag-like filter sock 17 is designed to be closed at its first axial end 18 and forms in this way a bag bottom. Said closed end 18 of the filter sock 17 can in this way be formed from the same flexible and air-permeable material, as the casing or filter surface of the filter sock 17. Alternatively or in combination therewith, it is also possible to design said first axial end 18, in particular the bottom or base surface of the filter sock 17, to be air tight or to reinforce it by means of a base plate. It is also possible to close the first axial end 18 of a tube-like filter sock 17 simply by means of a welding or yarn seam, in order to prevent the entry of particles into the inner chamber of the filter element 8. According to a substantially bag-like design of the filter sock 17 an opening is formed at its second or distal end 19, in particular an air outlet opening 20 for the unhindered outlet of cleaned air from the filter sock 17 or from the inside of the filter element 8. Overall the filter sock 17 made from a flexible, for example textile-like material, can be denoted as an air-permeable filter bag which is open on one side, whereby preferably the outer surface of said filter bag represents the filter surface of the filter element 8.

On the inside of the bag or tube-like filter sock 17 a support body 21 for the flexible filter sock 17 is provided which is sufficiently stable in mechanical terms. Said support body 21 also has the objective of supporting the flexible or bag-like filter sock 17, such that the filter sock 17 adopts a hollow shape or a minimum size with respect to the volume or under the influence of the air flow maintains a defined body shape. Depending on the body shape or the structural design of the support body 21 the bag-like filter sock 17, which encases the support body 21 at least in sections, adopts a hollow body-like shape with a largely cylindrical, elliptical, polygonal or other cross sectional shape.

The filter sock 17 is preferably dimensioned in relation to the support body 21 arranged therein or inserted into the filter sock 17 such that in the inactive or not flowed around state it surrounds the support body 21 comparatively loosely or with lateral play, and under the effect of air flow folds or waves are formed and a close lining of the support body 21 is provided by the filter sock 17.

A diameter 22, in particular the smallest diameter 22 of the air outlet opening 20 in the filter sock 17 is in this case approximately the same or slightly larger than the greatest external diameter 23 or external circumference of the support body 21. This means that the opening width of the filter sock 17 is dimensioned at its open or second axial end 19 such that the support body 21 can be pushed into the filter sock 17 and removed again from the latter. Alternatively, it is of course also possible to push the filter sock 17 on relative to the support body 21, wherein the air outlet opening 20 of the filter sock 17 is dimensioned so that it is possible to push on and remove the filter sock 17 relative to the support body 21. The air outlet opening 20 is thus dimensioned such that it is possible to insert the support body 21 inside the filter sock 17 almost coaxially and then separate the support body 21 and the filter sock 17 without difficulty.

According to an advantageous embodiment an internal diameter 24 or an internal width or an internal circumference of the filter sock 17 immediately adjoining its open, axial end 19 is larger in comparison than the diameter 22 of the filter sock 17 in the region of the air outlet opening 20. Furthermore, the internal diameter 24 of the filter sock 17 in cross sectional areas between the air outlet opening air outlet opening 20 and its closed end 18 is considerably larger in dimension than the greatest external diameter 23 or the greatest external circumference of the support body 21. This means that the filter sock 17 surrounds the support body 21 relatively loosely in extensive sections so that wave or fold formations of the filter sock 17 are possible after the filter sock 17 has been pulled onto the support body 21 or the support body 21 has been inserted into the filter sock 17. Said relaxed or loose casing of the support body 21 by the filter sock 17 is an advantage with respect to the filter performance, as described further in the following. In any case between the outer support or casing surface of the support body 21 and the internal surface of the filter sock 17 there is sufficient play to enable several folds or waves to be formed in the filter sock 17, as best shown from an overview of FIGS. 4 and 8. In particular, the cross sectional dimensions of the filter sock 17 compared to the cross sectional dimensions of the support body 21 are such that the flexible filter sock 17 with the air currents occurring during the operation around the filter element 8 or in the direction of the inner chamber of the filter element 8 can form a plurality of folds or loops or a plurality of meandering bends, as best shown in FIG. 8.

To achieve a sufficiently loose casing of the support body 21 by means of the filter sock 17 an internal diameter 24 or internal circumference of the filter sock 17 can be greater at least about 10% greater, in particular easily up to 80% greater than the greatest external diameter 23 or the greatest external circumference of the support body 21. It is advantageous to make the internal diameter 24 or the internal circumference of the filter sock 17 20% to 40% greater than the largest external diameter 23 or the greatest external circumference of the support body 21. It is essential that the filter sock 17 surrounds the support body 21 relatively loosely at atmospheric ambient pressure and does not bear closely against the external circumference of the support body 21. The flexible, air-permeable filter sock 17 in the inactive, i.e. current-free state of the filter element 8 should surround the support body 21 with sufficient play and should be a loose casing for the support body 21, wherein the filter sock 17 on its outer or filter surface can adopt a folded contour or periodic wave structure, when the filter element 8 is active or is charged with air currents from the outside, as shown schematically by way of example in FIG. 8. Said folding or shaping of the flexible filter sock 17 caused by the flow pressure to the outer support or casing surface of the 21 improves the filtering performance of the filter element 8. Said relatively exact in some parts and relatively unstructured shape adjustment between the filter sock 17 and the support body 21 is performed preferably by the effect of force of the air current to be cleaned, in particular by the low pressure created in the hollow inner chamber of the filter element 8 which is established during the correct use of the filter element 8.

The filter sock 17, which has the main job of filtering out at least a portion of the particles from the air stream, depending on the size of the particles to be filtered out or depending on the range of particle sizes to be separated has a prespecified mesh width or permeability. The filter sock 17 is in this case formed by a stretch-resistance or barely stretchable material, whereby the wave or fold formation occurring in connection with the support body 21 during the active state of the filter element 8 is mainly achieved from the length of the filter medium of the filter sock 17 that is significantly greater than the inner support body 21.

In particular, by means of the much looser casing of the support body 21 designed to have radial play by the filter sock 17 as far as possible a uniform or planned shape adjustment of the flexible filter sock 17 to the surface contours of the support body 21 is achieved, as explained by way of example in FIG. 8 and partly in an idealized manner. The filter sock 17 is in this case not or only partly stretched during the adjustment to the support body 21. The shape adjustment of the filter sock 17 to the outer surface or support contour of the support body 21 is largely based on the comparatively larger dimensions of the filter sock 17 or the large volume extension of the filter sock 17 compared to the support body 21.

As shown best in FIG. 2, the free air outlet opening 20 of the filter sock 17 is designed to be much narrower in cross section, than the cross sectional planes adjoining the air outlet opening 20 by the tube or bag-like casing section of the filter sock 17.

According to an advantageous development the filter sock 17 in its end section comprising the air outlet opening 20 and with reference to an extension from the inside of the filter sock 17 is designed to taper in the manner of a truncated cone in the direction of the air outlet opening 20. In particular, the filter sock 17 from its open, axial end 19 comprising the air outlet opening 20, in the direction of its closed end 18 can have a truncated cone expanding transitional section 25. The conical or truncated cone shaped transitional section 25 extends preferably only over a fraction of a total axial length 26 of the filter sock 17. Immediately adjacent to the truncated cone shaped tube-like transitional section 25 the filter sock 17 has up to or close to its closed end a hose-like casing section 27 with a cylindrical or elliptical cross section, which extends with constant or largely constant cross sectional dimensions, in particular internal circumference or inner diameter 24, up to the closed end 18 of the filter sock 17.

According to an advantageous embodiment the filter sock 17 on its air outlet opening 20 and/or between the air outlet opening 20 and its closed end 18 can comprise at least one elastically extendable flange element 28. Said flange element 28 is designed such that its elastic force causes an elastic narrowing or restriction of the internal diameter 24 or the diameter of the filter sock 17 in radial direction to the support body 21. Said flange element 28 can thus be provided directly in the circumferential area around the air outlet opening 20 and/or in sections between the air outlet opening 20 and the closed end 18. Such flange elements 28 divide the filter sock 17 into at least two part sections that are consecutive in axial direction. The elastic flange elements 28 operate such that the filter sock 17 in the vicinity of the elastic flange element 28 bears with elastic pretensioning against the support body 21 or is forced against the support body 21. In this way the correct distribution or planned relative positioning of the filter sock 17 relative to the support body 21 can be ensured. Elastic flange elements 28 of this kind are known for example from the sleeve ends of articles of clothing with a similar function. The flange elements 28 can comprise at least one elastic bungee in the textile or fabric-like filter sock 17.

To ensure as far as possible the uniform distribution of the filter sock 17, which surrounds the support body 21 loosely or sleeve-like, at least two, preferably three connecting points 29-29" arranged over the cross sectional circumference of the filter sock 17 and the support body 21 can be provided between the filter sock 17 and the support body 21, as shown schematically in FIG. 4. Said connecting points 29-29" should prevent the one-sided collection or very uneven grouping of the filter sock 17 at individual circumferential sections and ensure as far as possible an even distribution of the filter sock 17 relative to the support or casing surface of the support body 21.

At the respective connecting points 29-29", which are provided in axial direction and/or in circumferential direction around the support body 21, at least one connecting element 30 is provided. Said connecting element 30 can be formed by any coupling element known from the prior art, which can preferably be activated and deactivated without tools. In particular, it is possible, as a connecting element 30 between the filter sock 17 and the support body 21 to provide at least one catch-like push button connection, at least one clip, at least one magnetically acting holding element or the like. In particular, in or on the filter sock 17 at least one permanent magnet can be arranged, which with sufficient magnetic holding force ensures a force-closed connection between the ferromagnetic or metallic support body 21 and the filter sock 17. The connecting points 29-29" or the corresponding connecting elements 30 are designed in any case such that a planned or as far as possible even distribution of the filter sock 17 is ensured in circumferential direction and/or in axial direction of the support body 21, as can be taken mainly from the schematic and exemplary representation according to FIG. 4.

As best shown in FIGS. 5 to 7, the casing or support surface of the hollow or tube-like support body 21 is formed by an air-permeable panel or plate element 31. In particular, the support body 21 can be formed by a planar or board-like plate element 31 in the original state, which is rolled up or put together to form a hollow body 32 with cylindrical, elliptical or polygonal cross sectional form. The support body 21 or its plate element 31 has in any case a high degree of air permeability; in particular a low resistance to air flow. The support body 21 or its plate element 31 shaped into a hollow body can be formed for example by a perforated sheet or a so-called expanded metal element, which has a high degree of permeability to air and also has sufficient stability in order to resist the forces which are mainly caused by the air flow.

The air permeable plate element 31 or the support body 21 formed therefrom preferably comprises a plurality of evenly distributed openings 33 arranged in columns and rows. A cross section of the preferably structured distributed openings 33 is between 0.5 cm$^2$ and 5 cm$^2$ respectively, preferably about 1 cm$^2$. The selection of the cross sectional size of the openings 33 depends essentially on the tearing resistance of the filter sock 17, on the flow forces acting on the filter sock 17 and on the mesh width of the filter sock 17. Mainly in the case of in particularly tear-resistant filter socks 17 it is also possible to make the cross section of the openings 33 in the support body 21 greater than 5 cm$^2$, for example up to 50 cm$^2$. In this way the support body 21 can be designed to be relatively light in relation to its mass. In addition, such a support body 21 with relatively large openings 33 has a relatively low flow resistance. It is advantageous, if the sum of the cross sections of the openings 33 in the air permeable plate element 31 or in the support body 21 is greater than a sum of the support surface between the openings 33 for the filter sock 17. Such properties can be achieved easily in particular by a so-called expanded metal element. Such an expanded metal element has high air permeability and low flow resistance and sufficient stability, in order to provide suitable support for the flexible material, in particular for the textile-like material of the filter sock 17.

According to an advantageous embodiment, as shown in FIGS. 5 to 7, the air-permeable plate element 31 or the support body 21 assembled therewith is designed to be wave-like in cross section. In particular, the board-like plate element 31 in the original state, which is subsequently worked into a hollow body 32, can be formed by an air-permeable or perforated waved sheet metal element. Such waved metal sheets can be obtained by the wave-like shaping of a planar sheet metal panel or a previously planar expanded metal element. The air permeable plate element 31 that is waved accordingly in cross section 1 is thus shaped in a further shaping or processing step into an air permeable, preferably cylindrical hollow body 32, as shown by way of example in FIG. 7. Alternatively, it would also be possible to create the hollow body of the support body 21 by an extrusion procedure, in particular by plastic extrusion, and to achieve the air permeability of the casing section by mechanical processes, such as e.g. boring, milling or stamping procedures.

It is advantageous, if the hollow support body 21 that is air permeable relative to its support of casing surface is designed to be star or gear-shaped in cross section, as shown by way of example mainly from the cross sectional view according to FIG. 6. Said support body 21 has as a cross sectional external contour several depressions 34 and elevations 35 which are consecutive in the circumferential direction of the support or casing section. Said immediately consecutive depressions 34 and elevations 35 produce the waved or star or gear-shaped cross sectional contour of the support body 21. It is essential that the support body 21 by way of said groove-like depressions 34 and bead-like elevations 35 with prespecified diameter of for example 160 mm, has a much enlarged support or casing surface, which is formed by the surface of the adjacent depressions 34 and elevations 35. In any case, the support body 21 through the numerous, axially running, groove-like depressions 34 and the numerous, axially running, bead-like elevations 35 have a much enlarged casing or support surface for the filter sock 17—compared to a simply tubular support element or a strictly hollow cylindrical support body 21 with the same external diameter and with a smooth or non-contoured casing surface. Instead of the preferably wave-shaped circumferential contour of the support body 21 it is also possible, to provide a circumferential contour on the support body 21 which is triangular or trapezoidal in cross section.

The correspondingly enlarged casing or support surface of the support body 21 is used for supporting the filter sock 17 that is relatively large in relation to its diameter or casing surface, whereby the filter sock 17 can adapt at least approximately to the external surfaces of the depressions 34 and elevations 35, as illustrated partly in an idealized manner in FIG. 8. The support body 21 thus comprises a casing or support surface, which compared to a conventional support basket with the same external diameter 23 can mount or position a much larger area filter sock 17.

In particular, the indicated support body 21 owing to its preferably waved surface structure can hold a filter sock 17 with a comparatively larger, more effective filter surface and thus form a filter element 8 with a better filter performance. It is essential in this case that an existing filter device 1, which comprises openings 10 with a predefined or delimited diameter 11—FIG. 1—, can be provided easily with filter elements 8 according to the invention, whereby a filter device 1 with improved filter performance can be achieved. In particular, the installation of the described filter elements 8 with a much larger, more effective filter surface is made possible, without in this way having to convert the filter device 1—mainly in respect of the separating plate 5 or the support elements for the filter elements 8. In any case, the effective filter surface with the given filter element 8 compared to a conventional filter element can be significantly enlarged by a conventional grid-like support element and thus the filter performance of the filter device 1 can be increased overall.

It is advantageous in this case if the countersunk sections of the groove-like depressions 34 and/or crest sections of the bead or strip-like elevations 35 are designed to be rounded, as can be seen mainly from the cross sectional views according to FIGS. 6, 8. In this way the filter sock 17 is protected and wear to the filter sock 17 occurring during the active filter operation is minimized.

The flexibility or variability of shape of the filter sock 17 and the geometry of the support body 21 or its surface contours, in particular its depressions 34 and elevations 35, are preferably coordinated, such that the countersunk sections of the depressions 34 and the crest sections of the elevations 35 form respectively at least in sections support surfaces for the filter sock 17. The wear of the filter sock 17 is minimized in this way and filter socks 17 can be inserted, which have a comparatively low tearing resistance and have an optimum filtering characteristic for the respective use. As shown in FIG. 7, it is preferable if the depressions 34 and elevations, which are trapezoidal or even triangular in cross section, in particular wave-shaped in cross section, extend over the most part of the axial length of the support body 21, in particular over 80% to 100% of the axial length of the support body 21. In this way it is ensured that the space or room available in the filter device 1—FIG. 1—enables the use of a relatively large area or large volume filter sock 17.

According to the view in FIG. 5 the support body 21 can have in the end section, which is closest to the open end 19 of the filter sock 17, an expanding, in particular a conically expanding collar section 21a. By means of said collar section 21a the support basket 21 can be supportive in a load-bearing manner around the comparatively smaller opening 10 in the separating plate 5—FIG. 1, so that there is no chance of falling into the dirty air chamber 6. An internal diameter 24 of the filter sock 17 is in this case dimensioned, such that also the collar section 21a can be surrounded or encased by the bag-like filter sock 17. The internal diameter 24 or the internal circumference of the filter sock 17 is much greater, in particular at least 10% greater, or many times greater, than the external diameter 23 or the external circumference of the actual casing or support surface of the support body 21, so that during the action of flow forces at least in the casing section of the filter sock 17 it can provide a fold or wave formation without the filter sock 17 being expanded elastically.

As shown best from FIG. 8, the relatively large area or wide filter sock 17 in the original state, which can in the original state have the cross sectional dimension shown by dashed lines, under the effect of the air flow, lie as evenly as possible or relatively crease or fold free, against the outer casing surface of the support body 21. The relatively large casing or filter surface of the filter sock 17 is thus forced by the pressure of the air flow against the support body 21 and can thus adjust as uniformly as possible to the structured casing surface of the support body 21. In this condition a filter element 18 according to the invention with a contoured surface provides a much better filter performance compared to conventional hose filters with a cylindrical or almost cylindrical casing surface.

As already mentioned, it is possible by using the indicated filter element 8, with otherwise identical openings 10 or diameters 11 in the separating plate 5—FIG. 1—to install the new filter elements 8 with increased filter performance or increased lifetime. In this way on the one hand the maintenance is simplified and the lifetime increased and on the other hand a long term uninterrupted operation of a correspondingly designed filter device 1 can be achieved.

Figure 9:
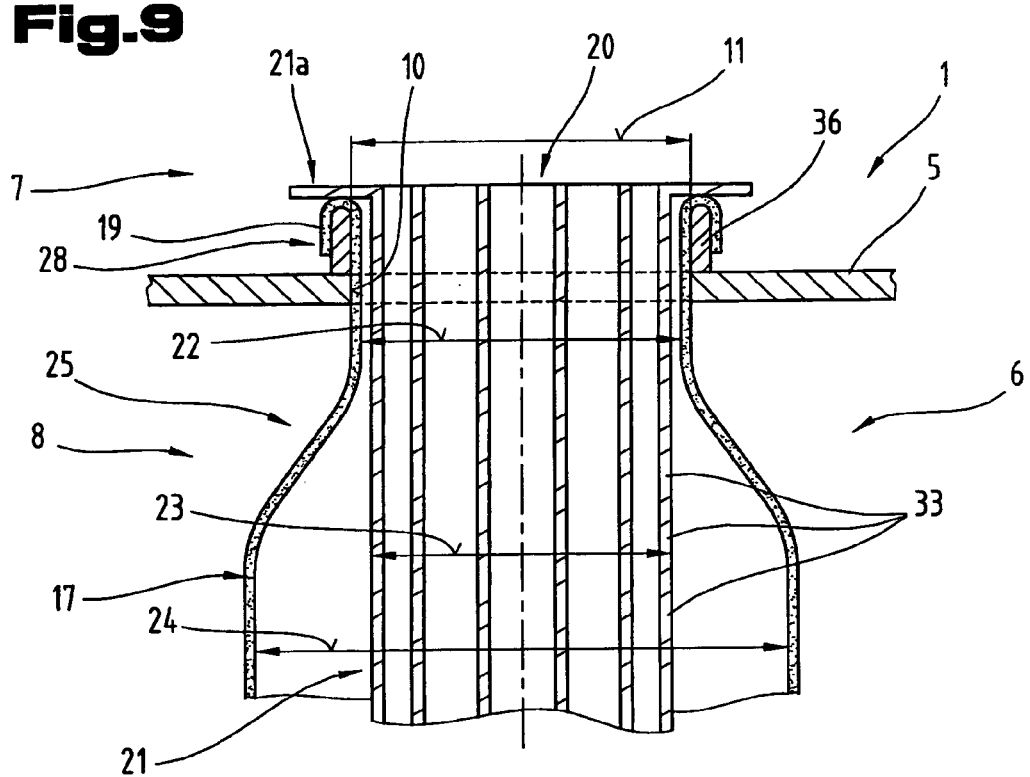
FIG. 9 shows a section of a further embodiment of a filter element inside a filter device in schematic cross sectional view.

In FIG. 9 a section of the filter device 1 is shown in the region around its filter element 8 or separating plate 5 in a schematic cross sectional view. For the aforementioned already described parts the same reference numbers are used and the above parts of the description can be transferred to the same parts with the same reference numbers.

In this case the filter sock 17 is secured by a flange element 28, which runs around the air outlet opening 20, relative to the separating plate 5. The flange element 28 can be designed to be elastically extendable, in particular provided with a bungee and/or comprises a belt or rope-like pulling element. By means of the flange element 28 the filter sock 17 can be secured onto a holding collar 36 projecting from the upper side of the separating plate 5, which runs around the opening 10. The holding collar 36 around the opening 10 is preferably designed to be annular. Preferably, the upper, open end 19 of the filter sock 17 is slipped around the holding collar 36, as shown schematically in FIG. 9. In this way the filter sock 17 is prevented from sliding into the dirty air chamber 6. The flange-like collar section 21a of the air permeable support body 21 provided with numerous openings 33 is supported on the upper end section of the filter sock 17 and thereby clamps the filter sock 17. In particular, the support body 21 with its preferably uninterrupted or partial upper collar section 21a prevents unwanted sliding of the filter sock 17 into the dirty air chamber 6. The support body 21 is in this case held in position by not shown screw or clamping connections in mechanically clamping pretension relative to the upper end 19 of the filter sock 17.

It is essential that the bag-like filter sock 17 from its open, axial end 19 expands in the direction of its closed axial end within an initial transitional section 25 relative to its cross sectional dimensions. Said transitional section 25 can be formed in this case by a structurally separate intermediate and end piece of the filter sock 17, which is connected to the hollow cylindrical or tube-like section of the filter sock 17, in particular stitched or welded. Alternatively, it is also possible to produce the filter sock 17 in one piece, in particular by a woven or knitting method, and in this way create a hollow, truncated cone shaped transitional section 25. According to an advantageous embodiment the filter sock 17 in the maximum expanded state has an approximately bottle-like side view or outline contour.

It is essential that the filter sock 17 inside the greatest part section of its axial extension has an internal diameter 24 or internal circumference, which is much greater, in particular at least 10% greater, than the greatest external diameter 23 or external circumference of the inner support body 21. In this way during the creation of low pressure in the inner chamber of the filter element 8 a drawing or suctioning of the filter sock 17 against the support body 21 is achieved, whereby by means of the interaction between the support body 21 and the relatively large volume filter sock 17 in the surface or in the filter medium of the filter sock 17 a specific wave or fold formation is obtained, as indicated in FIG. 1 or 8 schematically.

A diameter 22 or external circumference of the filter sock 17 in the vicinity around the air outlet opening 20, that is in the region of the assembly zone, corresponds essentially to the diameter 11 or the circumference of the opening 10. In particular, the diameter 22 of the filter sock 17 in the region of the air outlet opening 20 is approximately equal to or slightly greater than the external diameter 23 of the support body 21, as shown schematically in FIG. 9.

Figure 10:
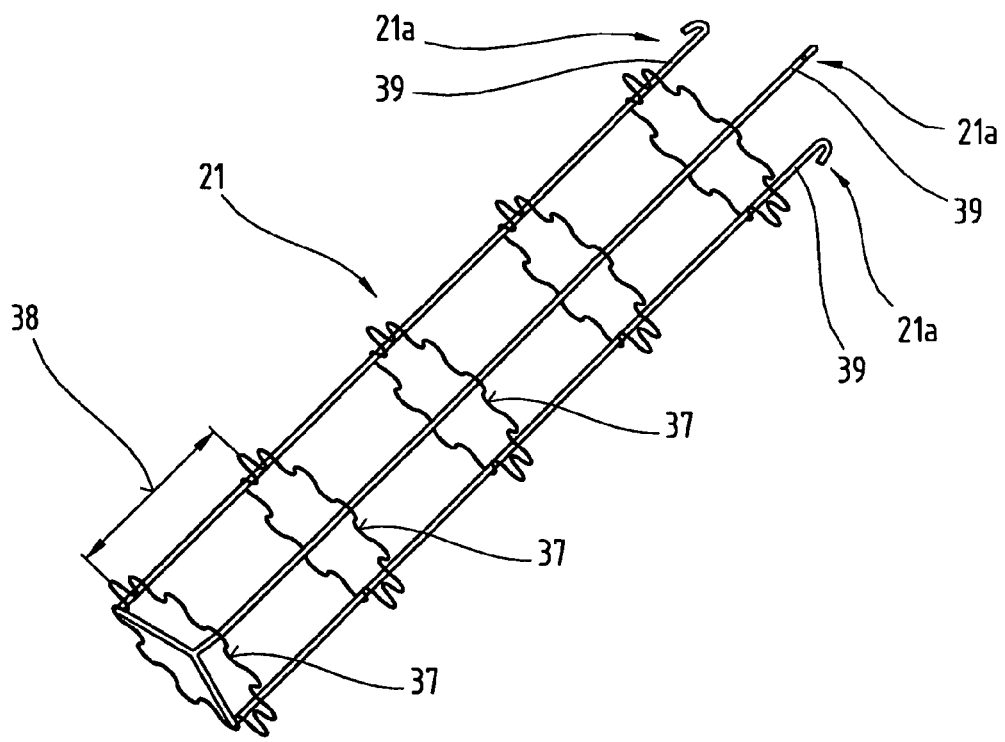
FIG. 10 shows a further embodiment variant of a support body for a filter element in perspective view.

FIG. 10 shows a further embodiment variant of a support body 21, which forms a part component of a filter element 8, as can be used in the filter device 1 according to FIG. 1.

In this case the support body 21 is formed by several essentially parallel aligned and in plan view almost star or gear shaped ring elements 37. In particular, preferably ring-shaped closed elements are formed with a wave or sinus-shaped outline contour. Said ring elements 37 are in this case arranged next to one another in layers or a stack, whereby the individual ring elements 37 are held at a predefined distance 38 from one another. Preferably, the individual star or gear-shaped ring elements 37 are kept spaced apart from one another by at least one rod element 39 running in the axial direction of the support body 21. Usually, at least two, preferably three rod elements 39 are formed, by means of which the individual ring element 37 are threaded or held a corresponding distance 38 apart.

Preferably, said support body 21 is designed as a welded construction, where the rod elements 39 can be positioned inside or outside the ring elements 37 and at the respective crossing points between the ring element 37 and rod element 39 mechanical connections are formed, in particular welded connections. On an axial end of the support body 21 the rod elements 39 can be shaped to be hook-like and thus form the collar section 21a for the load-transferring support on the separating plate 5 of a filter device 1—FIG. 1, 9. Such a support body 21 can be designed to be particularly light-weight and such a support body 21 facilitates as far as possible a uniform and easily reproducible wave or fold formation in combination with a relatively large volume filter sock 17 surrounding the support body 21 with lateral clearance, as indicated in FIG. 9.

The exemplary embodiments show possible embodiment variants of the filter device 1 or the filter element 8, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field. Thus all conceivable embodiment variants, which are made possible by combining individual details of the embodiment variants shown and described, are also covered by the scope of protection.

Finally, as a point of formality, it should be noted that for a better understanding of the structure of the filter device 1 and the filter element 8 the latter and its components have not been represented true to scale in part and/or have been enlarged and/or reduced in size.

The underlying objective of the solutions according the invention can be taken from the description Mainly the individual embodiments shown in FIGS. 1; 2-4; 5-7; 8; 9; 10 can form the subject matter of independent solutions according to the invention. The objectives and solutions according to the invention relating thereto can be taken from the detailed descriptions of these figures.

LIST OF REFERENCE NUMERALS

1 Filter device
2 Housing
3 Air inlet opening
4 Air outlet opening
5 Separating plate
6 Dirty air chamber
7 Clean air chamber
8 Filter element
9 Hollow body
10 Opening
11 Diameter
12 Collecting pan
13 Application device
14 Outlet opening
15 Cleaning device
16 Compressed air cleaning device
17 Filter sock
18 First axial end (closed)
19 Second axial end (open)
20 Air outlet opening
21 Support body
21a Collar section
22 Diameter
23 Outer diameter
24 Inner diameter
25 Transitional section
26 Length
27 Casing section
28 Flange element
29-29″ Connecting point
30 Connecting element
31 Plate element
32 Hollow body
33 Opening
34 Depression
35 Elevation
36 Holding collar
37 Ring element
38 Distance
39 Rod element

The invention claimed is:

1. A filter element for cleaning an air stream charged with particles, the filter element
comprising a bag-like filter sock made of an air-permeable and flexible material for separating particles from an air stream supplied to an outer surface of the filter sock, and
comprising a hollow air-permeable support body on the inside of the bag-like filter sock, said support body supporting the filter sock such that the filter sock has a hollow shape,
wherein the bag-like filter sock is designed to be closed at its first axial end and on its second axial end has an air outlet opening for the outlet of the cleaned air stream from the filter sock,
wherein an inner diameter or inner circumference of the filter sock is greater in cross sectional areas between the air outlet opening and its closed, first end than an outer diameter or outer circumference of the support body within the same cross-sectional area,
such that the filter sock surrounds the support body in the inactive state of the filter element without air flow loosely and with lateral play, and
such that folds or undulations parallel to the longitudinal direction of the filter element are formed, at least in a casing section of the filter sock, in an active state of the filter element when air flows against the outer surface of the filter sock, and the filter sock thus lies closer to the support body, and
wherein in its inactive state the air-permeable and flexible material from the second axial end with the air outlet opening in the direction toward the first, closed end has constructionally predefined a hollow, widening transitional section,
wherein the hollow, widening transitional section takes up only a fraction of an axial length of the filter sock and has a form of a truncated cone, so that in side view of the filter sock it has a bottle-like outline shape,
wherein the casing section of the filter sock is positioned between the hollow, widening transitional section and the closed, first end, the casing section having a casing section inner diameter or a casing section inner circumference, wherein a diameter of the air outlet opening of the filter sock is smaller than the casing section inner diameter or is smaller than the casing section inner circumference,
wherein during the entirety of the active state the closed first axial end and the casing section with respect to its entire axial length are collapsible in their shape and therefore radially displaceable relative to the support body so that the support body lies against the closed first axial end and the casing section, and
wherein
the hollow, widening transitional section is formed in one piece with the casing section and is woven or knitted to form the hollow, widening transitional section, or
the hollow, widening transitional section is formed as a first piece, the casing section is formed as a second piece separate from the first piece, the first piece widens, and the first piece is subsequently connected to the second piece via stitching or welding.

2. The filter element as claimed in claim 1, wherein the casing section adjoins the hollow transitional section and has a hollow-cylindrical or hollow-elliptical shape, and
wherein the casing section inner diameter or the casing section inner circumference is constant.

3. The filter element as claimed in claim 1, wherein the diameter of the air outlet opening of the filter sock is the same size or larger than the greatest outer diameter or outer circumference of the support body.

4. The filter element as claimed in claim 1, wherein the hollow support body is designed to be star or gear-shaped in cross section.

5. The filter element as claimed in claim 1, wherein the support body is formed by several essentially parallel ring elements that are approximately star or gear-shaped in plan view and which are held spaced apart from one another by at least one rod element running in the axial direction of the support body.

6. The filter element as claimed in claim 1, wherein the casing section is adjacent the hollow, widening transitional section.

7. The filter element according to claim 1, wherein the inner diameter or the inner circumference of the filter sock is at least 10% greater in cross sectional areas between the air outlet opening and its closed, first end than the outer diameter or the outer circumference of the support body within the same cross-sectional area.

8. The filter element according to claim 1, wherein the inner diameter or the inner circumference of the filter sock is from 20% to 40% greater in cross sectional areas between the air outlet opening and its closed, first end than the outer diameter or the outer circumference of the support body within the same cross-sectional area.

9. The filter element as claimed in claim 1, wherein the filter sock around the air outlet opening comprises an elastically extendable flange element, whose elastic force is intended to narrow or restrict the internal diameter of the filter sock in radial direction to the support body.

10. The filter element as claimed in claim 9, wherein the filter sock in the area around the elastically expandable flange element bears with elastic pretensioning against the support body.

11. The filter element as claimed in claim 1, wherein between the filter sock and the support body at least two connecting points are provided distributed over the cross sectional circumference of the casing section of the filter sock and the support body.

12. The filter element as claimed in claim 11, wherein the connecting points are provided for maintaining an even distribution of the filter sock in relation to the circumferential direction of the support body.

13. The filter element as claimed in claim 11, wherein at the connecting points at least one connector is provided, so that even distribution of the filter sock is ensured in the circumferential direction of the support body.

14. The filter element as claimed in claim 1, wherein a casing section of the support body is formed by an air permeable plate element which is rolled up or put together to form a hollow body with a cylindrical, elliptical or angular cross sectional form.

15. The filter element as claimed in claim 14, wherein the air-permeable plate element comprises a plurality of evenly distributed openings, which respectively have an opening cross section of between 0.5 $cm^2$ to 5 $cm^2$.

16. The filter element as claimed in claim 14, wherein the hollow body comprises a lateral wall running between its first end and its second end and comprises a plurality of openings in the lateral wall, and
wherein the sum of the cross sectional areas of the openings in the lateral wall is greater than the sum of areas of support surfaces of the lateral wall remaining for the filter sock between the openings.

17. The filter element as claimed in claim 14, wherein the air-permeable plate element is designed to be wave-like in cross section.

18. The filter element as claimed in claim 14, wherein the support body in relation to the cross section through its casing section comprises several depressions and elevations which follow one another alternately in relation to its cross sectional circumference.

19. The filter element as claimed in claim 18, wherein countersunk sections of the depressions and crest sections of the elevations are rounded.

20. The filter element as claimed in claim 18, wherein countersunk sections of the depressions and crest sections of the elevations respectively form support surfaces of the filter sock.

21. The filter element as claimed in claim 18, wherein the depressions and elevations are designed to be wave-like in cross section and extend over a proportion of the axial length of the support body.

22. A filter device for cleaning an air stream charged with particles, the filter device comprising a housing with an air inlet opening for unclean air, an air outlet opening for filtered air, a separating plate, which divides the housing into a dirty air chamber and a clean air chamber, and at least one filter element according to claim 1, which is mounted on the separating plate, such that the at least one filter element projects into the dirty air chamber and creates a filtering air flow connection between the dirty air chamber and the clean air chamber,
wherein in the separating plate at least one opening is formed, through which the at least one filter element is inserted and secured from the clean air chamber in the direction of the dirty air chamber.

23. The filter device as claimed in claim 22, wherein the filter sock that has been expanded to its maximum volume or expanded to its maximum cross section has an internal diameter or external circumference, which is greater than a diameter or circumference of the opening in the separating wall.

24. The filter device as claimed in claim 22, wherein a maximum cross sectional extension of the support body is dimensioned for the bag-like, flexible filter sock, such that the support body can be moved without deformation from the clean air chamber via the opening into the dirty air chamber.

\* \* \* \* \*